(12) United States Patent  (10) Patent No.: US 7,612,303 B1
Floyd  (45) Date of Patent: Nov. 3, 2009

(54) SELF CONTAINED AXLE LOAD SCALE FOR VEHICLES HAVING SPRING SUSPENSIONS

(75) Inventor: Dennis L Floyd, Santa Rosa, CA (US)

(73) Assignee: QuickCheck Axle Scales, Inc., Santa Rosa, CA (US)

( * ) Notice: Subject to any disclaimer, the term of this patent is extended or adjusted under 35 U.S.C. 154(b) by 8 days.

(21) Appl. No.: 11/737,689

(22) Filed: Apr. 19, 2007

Related U.S. Application Data

(60) Provisional application No. 60/745,161, filed on Apr. 19, 2006.

(51) Int. Cl.
  *G01G 19/08* (2006.01)
(52) U.S. Cl. ...................................................... 177/141
(58) Field of Classification Search ................. 177/136, 177/137, 141
  See application file for complete search history.

(56) References Cited

U.S. PATENT DOCUMENTS

| | | | | |
|---|---|---|---|---|
| 2,717,775 A * | 9/1955 | Jackson | ...................... | 177/137 |
| 2,796,251 A * | 6/1957 | Donaldson | .................. | 177/137 |
| 3,109,505 A * | 11/1963 | Davis et al. | .................. | 177/137 |
| 3,151,692 A * | 10/1964 | Dysart | ........................ | 177/138 |
| 3,167,142 A * | 1/1965 | Meneely | ..................... | 177/137 |
| 3,420,325 A * | 1/1969 | McAlister et al. | ........... | 177/137 |
| 3,428,139 A * | 2/1969 | Nolan | ......................... | 177/137 |
| 3,480,095 A * | 11/1969 | Tuchman | .................... | 177/137 |
| 3,771,614 A * | 11/1973 | Kerr | ............................ | 177/137 |
| 4,375,839 A * | 3/1983 | Manning et al. | ............ | 177/137 |
| 4,384,628 A * | 5/1983 | Jackson | ....................... | 177/137 |
| 4,756,374 A * | 7/1988 | Bailey et al. | ................. | 177/137 |
| 4,832,141 A * | 5/1989 | Perini et al. | .................. | 177/141 |
| 4,854,407 A * | 8/1989 | Wagner | ....................... | 177/141 |
| 4,917,197 A * | 4/1990 | Waite, Jr. | ..................... | 177/137 |
| 4,981,186 A * | 1/1991 | Shankle et al. | .............. | 177/141 |
| 5,369,222 A * | 11/1994 | Strelioff | ...................... | 177/136 |
| 5,410,109 A * | 4/1995 | Tarter et al. | .................. | 177/136 |
| 5,478,974 A * | 12/1995 | O'Dea | ..................... | 177/25.14 |
| 5,522,468 A * | 6/1996 | Dohrmann et al. | .......... | 177/136 |
| 7,141,746 B1 * | 11/2006 | Scott | ........................... | 177/137 |

* cited by examiner

*Primary Examiner*—Randy W Gibson
(74) *Attorney, Agent, or Firm*—Gary Hoenig

(57) ABSTRACT

The present invention is a self-contained, low cost and robust axle scale for weighing the load on a vehicle axle comprises a pneumatically supplied axle transmitter assembly capable of gauging the vertical displacement of the axle relative to the vehicle frame resulting from the compression of the axle suspension while bearing a cargo load wherein the axle transmitter assembly provides a pneumatic pressure output in proportion to the axle load and is communicated to an operator display pressure gauge appropriately scaled to indicate the load. The axle transmitter assembly comprises a self-returning variable pressure valve having a rotatable activator with an actuator lever arm perpendicularly fixed to the rotatable activator. The axle transmitter assembly is mounted on the vehicle frame such that the actuator lever arm rests on the axle. The pneumatic supply is drawn from the compressed air reservoir tank typically found on vehicles with pneumatic brakes such as trucks.

12 Claims, 3 Drawing Sheets

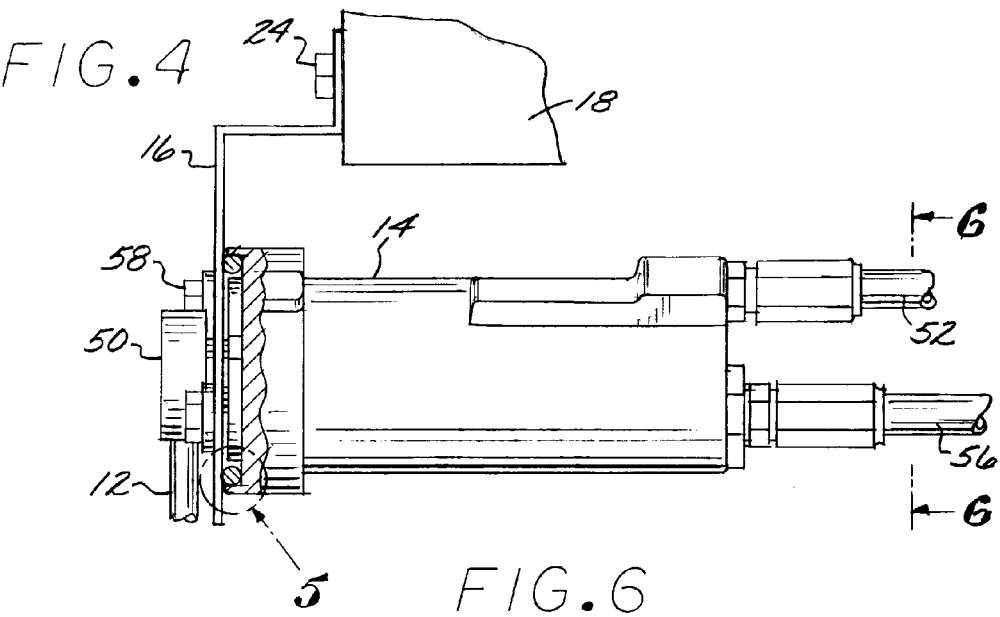
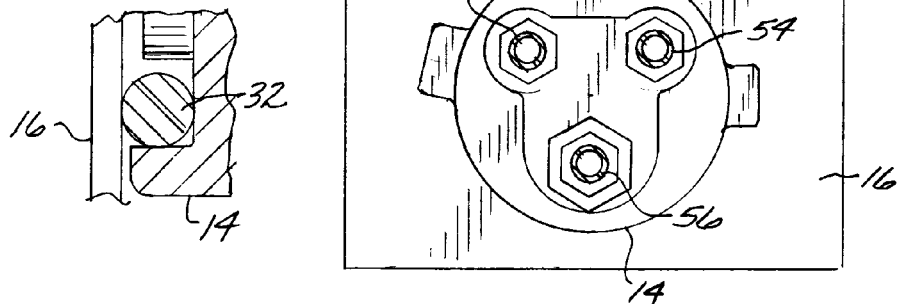
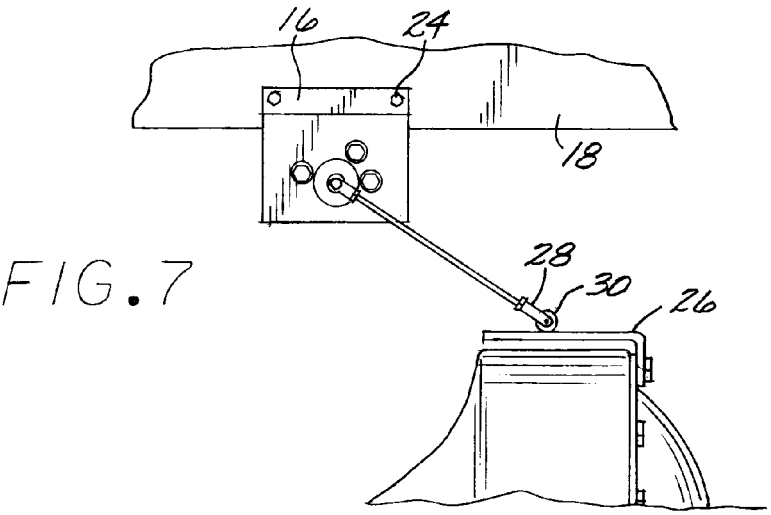

SELF CONTAINED AXLE LOAD SCALE FOR VEHICLES HAVING SPRING SUSPENSIONS

FIELD OF THE INVENTION

The present invention relates to axle weigh scales. More particularly, this invention is directed to a self contained axle load scale mounted on a vehicle used principally in the trucking industry for measuring the static load on a truck axle.

BACKGROUND OF THE INVENTION

The trucking industry is required to comply with regulations limiting the total weight and per axle load distribution imparted by a truck, including any cargo load, to a road surface. Typically a truck is loaded with cargo and then driven onto a weigh scale to measure the weight of each axle and the total combined weight.

Regulations specify the maximum total allowable weight permitted for a truck and also the maximum allowable weight per axle. Consequently, the trucker typically estimates the axle loads at time of loading the truck and drives the loaded to truck to a weigh scale facility prior to embarkation. The total weight of the truck load may be less then maximum total load limits while the distribution of the load among the axles may result in particular axles bearing excessive loads. Consequently efficient loading of the truck is a useful skill as adjustments to the distribution of the load are often time consuming and can be difficult once the truck is fully loaded.

The truck loading process has heretofore been guided primarily by experience and skill so as to distribute the load along a truck trailer or bed such that the total truck and axle weight regulations are satisfied while also maximizing the amount of cargo. Ideally, knowledge of the axle weights during the loading of the truck would facilitate the full loading of the truck so as to satisfy both objectives without the necessity of driving the truck to weigh scale facilities. Portable drive-on truck scales are sometimes carried with the trucks to facilitate axle load measurements at a loading site; however, this solution is usually not practical because of the inconvenience, size, weight and cost of the scales. Further, portable weigh scales when positioned on a surface present a vertical height offset such that when one set of wheels of a tandem axle are driven on to the scale, the load measurements must be corrected as the suspension springs of the measured wheel set are compressed more than the adjacent axle springs. Consequently, to obtain an accurate total weight of the vehicle one must utilize multiple portable axle scales located under each wheel set making portable scales impracticable for accurate on-site load measurement.

Alternatively, a dedicated apparatus mounted to each axle for load measurement eliminates the need to drive to a truck weigh scale facility. Incorporating a weigh scale apparatus permanently into a truck presents significant challenges. For a device to be mounted on the truck, the load measurement is accomplished by a transducer placed between the truck frame and the axle. For example, a transducer measuring load directly, such as a strain gauge, may be placed between the frame and the axle assembly. Alternatively, a linear displacement transducer may be positioned between the truck frame and the axle to measure the displacement of the frame relative to the undercarriage to measure the suspension compression. In either of these examples, electronic controllers are typically required to convert the transducer output signal into axle load information. The high capital cost of such controllers is often difficult to justify for dedicated installation. Additionally, for systems that are permanently mounted to the truck, the load transducer should be capable of tolerating both the large dynamic load changes and shocks presented by normal driving while also having sufficient sensitivity and capability to perform reliably and repeatability under the important static load conditions during truck cargo loading axle load measurement. Further, the harsh operating environment found between the truck frame and the road surface is particularly challenging for sensitive electronic transducers and the associated wiring and electronic controls. Road salts are aggressively corrosive to electronic components and wiring. Road debris requires transducers and sensors to be resistant to impact and particulate features.

Still other methods of axle scale load measurement include the incorporation of pneumatic bags in the suspension system wherein the air pressure in the bag increases with the compression of the bag in proportion to the axle loads. Alternatively, the pneumatic bag forms a portion of the shock absorbing or leveling. These measurement devices are typically integrated into the undercarriage suspension.

Accurate measurement of the axle loads, prior to the present invention, has required load measuring devices typically placed between the truck frame and the axle assemblies so as to measure the weight of a load and a truck frame. Load cells and other pressure measuring transmitters are typically mounted between the suspension and the axle. These systems are comprised of a transmitter element in electronic communication with a computing device and a data display element. The transmitters are exposed to high dynamic load changes during normal driving necessitating robust construction to achieve acceptable equipment reliability. Further, exposure to road debris, corrosives, oil and other hazards create a harsh operating environment especially for electronic components and wiring. Consequently economic and reliability constraints discourage the installation of axle load measuring devices.

What is needed is an improved truck axle scale being of low cost, simple installation, and incorporating robust engineering features capable of operation in environments present in and around the axle and carriage of a truck.

SUMMARY OF THE INVENTION

Accordingly, the present invention is directed to axle scale devices and, more specifically, to a self contained truck axle scale mountable on a truck or other vehicle being of robust design and low cost permitting permanent mounting to a truck thereby substantially obviating one or more of the problems due to the limitations and disadvantages of the related art.

The axle scale of this invention comprises a pneumatically supplied axle transmitter assembly capable of providing a pneumatic pressure output in proportion to the increased mechanical compression of the axle suspension springs as measured by the vertical linear displacement when gauged between the vehicle frame and the axle resulting from a cargo load. An operator display gauge, being in direct pneumatic communication with the output of the axle transmitter assembly and scaled accordingly to convert the pressure to an equivalent total axle load, presents the resulting load information to the operator. The axle transmitter assembly provides no or low pneumatic output pressure when no cargo load is present and increases as cargo load compresses the suspension springs. The operator display gauge is therefore scaled to reflect the total axle load presented to a road surface by indicating the axle load absent cargo when there is no or low pneumatic output pressure from the axle transmitter assembly.

The axle transmitter assembly comprises a variable pressure pneumatic valve, having a rotatable activator, capable of providing a pneumatic pressure to the operator display pressure gauge wherein the variable pressure pneumatic valve is activated in proportion to the load on an axle by means of an actuator lever, having proximate and distal ends, with the proximate end fixed perpendicularly to the rotatable activator member of the pneumatic valve and the distal end of the actuator lever in contact with the truck axle thereby providing rotation to the pneumatic valve in proportion to the vertical linear displacement of the axle relative to the truck frame when the truck is loaded with cargo.

An axle transmitter assembly is mounted to the truck frame for each axle with the actuator lever arm positioned to rest on the respective undercarriage axle assembly. Pneumatic pressure is supplied to the input of the axle scale transmitter valve and the output is communicated to an operator display gauge being a pressure gauge with markings corresponding to the load applied to the axle for given pressures. The loads on each axle are measured individually to determine the load distribution and totaled to determine the total weight of the vehicle and cargo load.

The linear displacement as determined by the change in distance between a reference point on the truck frame and the undercarriage is gauged by the resulting degree of rotation of the actuator of the variable pressure valve. The degree of rotation is therefore directly and linearly proportional to the linear displacement. In turn, the output port of the variable pressure valve presents a pneumatic pressure according to the degree of rotation of the rotatable activator.

As the axle transmitter assembly is pneumatically powered, the apparatus may be conveniently supplied by the compressed air reservoir present on vehicles with air braking system thereby eliminating the need for a separate, dedicated pneumatic supply.

An objective of the present invention is to minimize the cost of the apparatus. As such, the required pneumatic supply is alternatively drawn from the pneumatic braking supply already present on most trucks.

Still another objective to provide a robust design is accomplished by utilizing pneumatic pressure to communicate the axle load information. As such, plastic pneumatic lines may be utilized which are inexpensive, reliable and resistant to corrosion and road debris.

BRIEF DESCRIPTION OF THE DRAWINGS

The accompanying drawings, which are incorporated in and constitute a part of this specification illustrate embodiments of the invention and, together with the description, serve to explain the features, advantages, and principles of the invention.

FIG. 4 is a side view of the axle scale transmitter valve taken on the line 4-4 of FIG. 3 drawn in larger scale with a broken away area to show the o-ring seal.

FIG. 5 is an enlarged view of the o-ring area circled at arrow 5 in FIG. 4.

FIG. 6 is a rear view of the axle scale transmitter valve taken on line 6-6 of FIG. 4.

FIG. 7 is a front view of the axle scale transmitter valve mounted on the frame of the truck with actuator lever resting on and gauging the rear axle with the rear end plate mounted on the differential.

DETAILED DESCRIPTION OF THE PREFERRED EMBODIMENT

Figure 1:
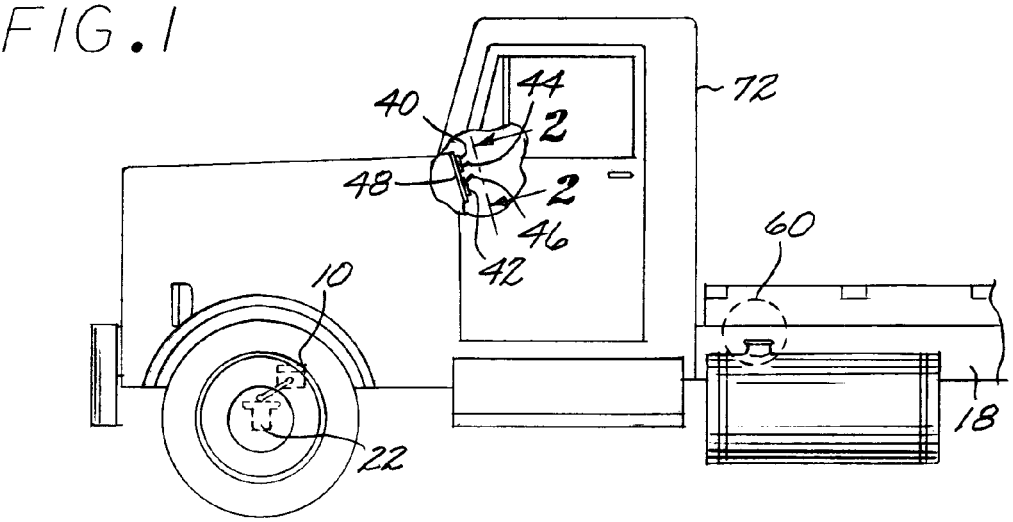
FIG. 1 is a side plan view of a truck, having been fitted with and in accordance with the present invention, with a broken away area to show the activating toggle switches and operator display gauges, for displaying axle loads, on the truck dashboard, the air tank and axle scale transmitter valve are in dotted outline.

Although particular embodiments of the invention have been described in detail for purposes of illustration, various modifications may be made without departing from the spirit and scope of the invention. Accordingly, the invention is not to be limited except as by the appended claims. Referring now in greater detail to the various figures of the drawings wherein like reference characters refer to like parts, there is shown in FIG. 1, a new type of self contained axle scale used in the trucking industry wherein an axle scale transmitter assembly 10 is mounted to the truck frame 18 so as to gauge the vertical displacement of an axle 22 resulting from a cargo loaded on the truck 72, being supplied by a pneumatic pressure from the compressed air reservoir tank 60, and providing an output pressure to an operator display gauge, two shown at 40 and 42, mounted on the dashboard 48 of the truck 72 and activated by actuator switches 44 and 46, wherein the gauge presents a reading associated with the load on the axle 22.

Figure 2:
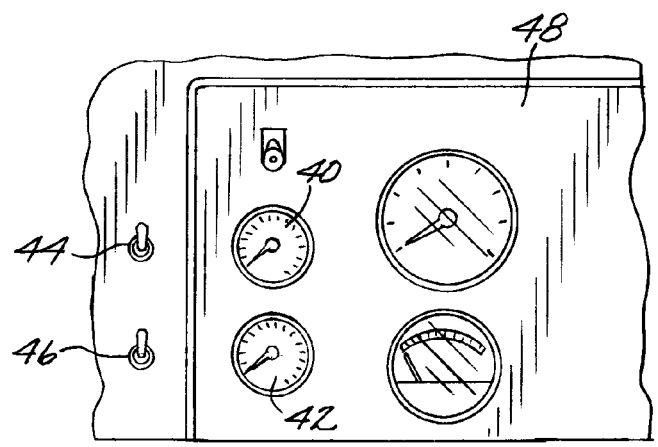
FIG. 2 is a plan view of the dashboard taken on line 2-2 of FIG. 1 showing the operator display gauges and the activator switches.

FIG. 2, taken along line 2-2 of FIG. 1, of the truck dashboard 48 shows the operator display gauges 40 and 42 conveniently mounted for viewing with activation switches 44 and 46 within close reach. The operator display gauges are responsive to pneumatic pressure and are preferably an analog display type gauge; however, digital display type gauges are also suitable.

Figure 3:
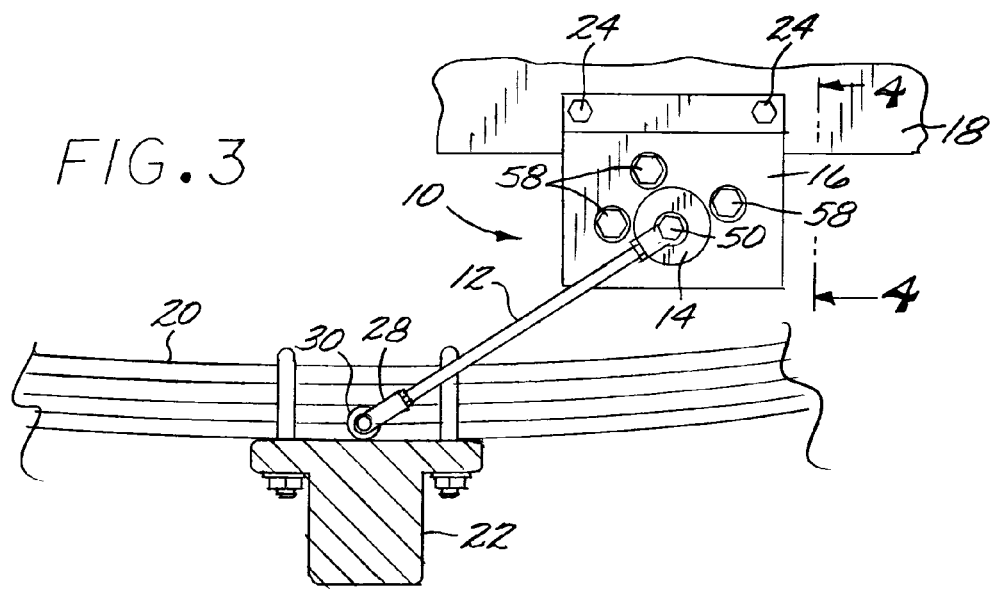
FIG. 3 is a front plan view of the present invention with the axle scale transmitter valve mounted on the frame of the truck and gauging the front axle.

Referring to FIG. 3, the axle transmitter assembly 10 comprises a variable pressure pneumatic valve 14 having a rotatable activator 50 with the proximate end of actuator lever arm 12 fixed perpendicularly to the rotatable activator 50 and a clevis 28 retaining roller 30 fixed to the distal end of the actuator lever arm 12. The axle transmitter assembly 10 further comprises a means for mounting to the vehicle frame 18 wherein the means is frame mounting plate 16, also shown in FIG. 3, attached to the frame 18 with mounting plate bolts 24 and with the variable pressure pneumatic valve 14 mounted to the mounting plate 16 with valve mounting bolts 58. The axle transmitter assembly 10 is fixed to the vehicle frame 18 in a position such that the roller 30 at the distal end of the actuator lever arm 12 rests on the vehicle axle 22.

Leaf spring suspensions commonly used in trucks and truck trailers deflect in an approximately linear manner and in proportion to the load for loads within the capacity limits of the truck. The leaf spring assembly 20, shown in FIG. 3, typically provides the means for mounting the axle 22 to the truck frame 18 and assumes the load applied to the axle 22. The amount of deflection of the suspension is also in proportion to the vertical displacement of the truck frame 18 relative to the axle 22. Other suspension systems exhibit similar vertical displacements in proportion to the load on the axle.

The preferred embodiment of the present invention gauges the vertical displacement of the axle relative to the truck frame using the variable pressure pneumatic valve 14 wherein the valve 14 presents a pneumatic pressure at the valve output proportional to the rotational position of the valve activator 50. Such pneumatic valves are known in the industry and are often used as a brake hand valve for truck pneumatic braking systems. Experiments have shown in the present invention that an industry standard Midland RN-0542 self-returning pneumatic valve exhibits the required functionality although others may be used.

Referring to FIG. 4, showing the axle transmitter assembly 10 with variable pressure valve 14 fixed to mounting plate 16 by valve mounting bolts 58 with the valve rotatable activator 50 protruding through the mounting plate 16 and actuator lever arm 12 extending perpendicularly from the rotatable activator 50. As also shown in FIG. 5, the variable pressure valve 14 is adapted to retain o-ring 32 for sealing the rotatable activator 50 mechanism from debris. The axle transmitter assembly 10 is mounted to the truck frame 18 with mounting bolts 24.

FIG. 6, showing a rear view of the transmitter assembly 10, illustrates the rear of the variable pressure valve 14 fixed to the mounting plate 16. The valve 14 provides a pneumatic supply inlet port 56, a pneumatic output port 52, an exhaust port 54 and includes an axially secured rotatable activator 50 with integral shaft wherein the pneumatic pressure presented at the output port 52 varies in direct proportion to the degree of rotation of the actuator shaft provided a pneumatic supply pressure is present at the supply inlet port 56. The activator 50 rotates from a rest position wherein the output port pressure is or near 0 PSI, the unactuated state, to a fully activated position, typically 50 degrees, wherein the output port 52 pressure is or near the pneumatic pressure supplied at the inlet port 56. The output pressure thereby varies proportionally with the rotation of the activator 50 from 0 PSI to the supply pressure. The pressure is created at the output port 52 by diverting air from the supply port 56 to the output port 52 until the output port 52 is at a pressure associated with the rotational position of the activator 50 shaft. The output port 52 is in pneumatic communication with a pressure gauge 40 by means of a pneumatic line. Pressurized air is supplied by the valve to pressurize the line and the pressure gauge until the required pressure corresponding to the degree of rotation of the activator 50 shaft is established. In this manner the gauge 40 reading is also in direct proportion to the pressure supplied by the valve 14 and therefore in direct relation to the rotational position of the activator 50 shaft of the valve 14. As the activator 50 shaft is rotated away from the rest position, the pressure supplied to the gauge 40 increases. Conversely, as the activator 50 shaft is rotated back towards the rest position, the pressure supplied to the gauge 40 decrease as the valve 14 vents air to the exhaust port 54.

Referring again to FIG. 3, the actuator lever arm 12 having a proximate and distal end is perpendicularly fixed at the proximal end to the activator 50 shaft with the distal end of the actuator lever arm 12 is positioned proximate to the axle 22 to be measured. The transmitter valve assembly is attached to the truck frame 18 and preferably positioned relative to the truck frame 18 such that the longitudinal portion of the rotatable activator 50 shaft is approximately parallel to the horizontal plane of the truck frame to maximize the rotation of the activator 50 shaft for any given vertical displacement. The transmitter assembly is additionally positioned such that the distal end of the actuator lever arm 12 contacts the truck axle 22 and rests on the truck axle 22 as the axle moves up or down relative to the truck frame 18 such that an upward motion of the truck axle 22 produces a rotation of the actuator 50 shaft in the direction of increasing the valve 14 output pressure. In the preferred embodiment, a variable pneumatic valve 14 of the transmitter assembly further comprises a spring mechanism to provide a force to return the rotatable activator 50 to the rest position thereby providing a means for the distal end of the actuator lever arm 12 to remain in contact with the truck axle 22 as the axle 22 moves up and down relative to the truck frame 18. The Midland RN-0542 valve, being a self-returning valve, provides a spring mechanism for returning the rotatable activator 50.

In the present invention, the length of the actuator lever arm 12 is conveniently adjusted to provide a relationship of 1 P.S.I. of pneumatic pressure presented by the transmitter assembly for every 1000 lbs of axle load. As the length of the actuator arm 12 defines the scaling of the invention, the length of the actuator lever arm 12 is determined by loading a particular truck tandem axle to 34,000 lbs and then adjusting the length of the actuator such that the gauge is presented with 34 P.S.I. of pneumatic pressure. Current trucking regulations limit tandem axle loads to 34,000 lbs, 20,000 lbs. for single axles, and 12,000 lbs. for the tractor front axles. The same technique is used when other axle weight limits other are required. Shortening the actuator lever arm 12 length increases the scale factor of the displacement of the axle 22 relative to the pneumatic pressure at the gauge 40. For most truck axle suspensions, both tandem and single axles, the vertical displacement relative to the truck frame due to the compression of a fully loaded truck has been determined to be in the approximate range of 1.25 to 1.75 inches thereby requiring an actuator lever length of approximately 5.25 inches. This actuator lever arm 12 length translates into approximately a 10 degree rotation of the proportional valve 14 and hence a 34 P.S.I. pneumatic pressure for tandem axles is presented to the operator gauge 40. These dimensions will vary depending upon the design of the truck upon which the invention is installed and the current trucking regulation load limits.

For tandem axles, calibration of the length of the actuator lever arm 12 should be performed on level ground as differences in ground level between the axles will load the axles differently resulting in differing spring compressions on each axle.

As the maximum compression of the suspension springs is small in relation to the maximum design displacement for axle suspensions, spring suspensions have been determined to respond linearly over the full load range for the truck when the truck is static thereby providing linearity of the present invention over the full load range. Experiments have shown that for a 34,000 lb. tandem axle load or a 20,000 lb. single axle load, undercarriage spring compression for single, three and multi-stacked assemblies generally produce a linear displacement of about 1.25 inches. When using the afore-identified Midland valve the actuator lever arm should be approximately 5.25 inches.

The clevis 28 with roller 30 is optional however a roller presented to the surface of the undercarriage minimizes the wear of the actuator lever arm 12 and axle 22 casing. As FIG. 7 shows, a strike plate 26 may also be used to provide a contact surface on an axle assembly particularly when irregularly shaped undercarriage features are encountered.

Figure 8:
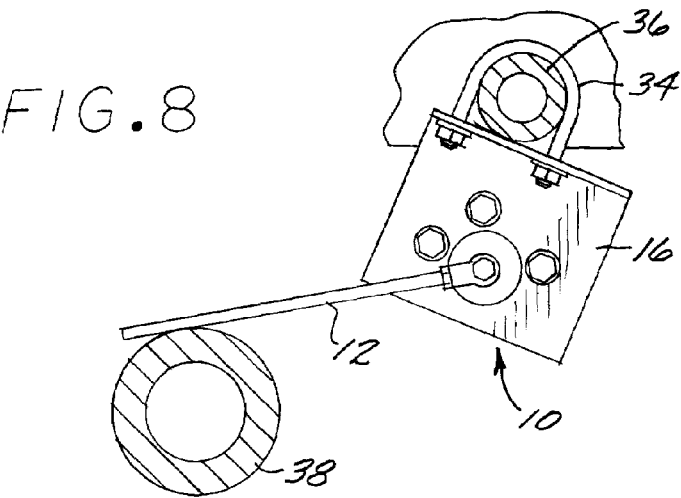
FIG. 8 is a view of an alternate mounting of the axle scale transmitter of the present invention wherein the transmitter and mounting plate are clamped to a tubular element of the truck frame and the actuator lever arm is resting on and gauging a truck axle assembly.

FIG. 8 illustrates an embodiment wherein no clevis with roller is utilized. This embodiment is useful when mounting the axle transmitter assembly 10 to vehicles with round undercarriage features such as the tubular axle at 38. Also note that a variety of embodiments of the mounting plate 16 may be engineered so as to accommodate mounting requirements. In FIG. 8, the mounting plate 16 is engineered to retain u-bolts 34 for mounting the axle transmitter assembly 10 on tubular structures 36 of a vehicle frame.

Figure 9:
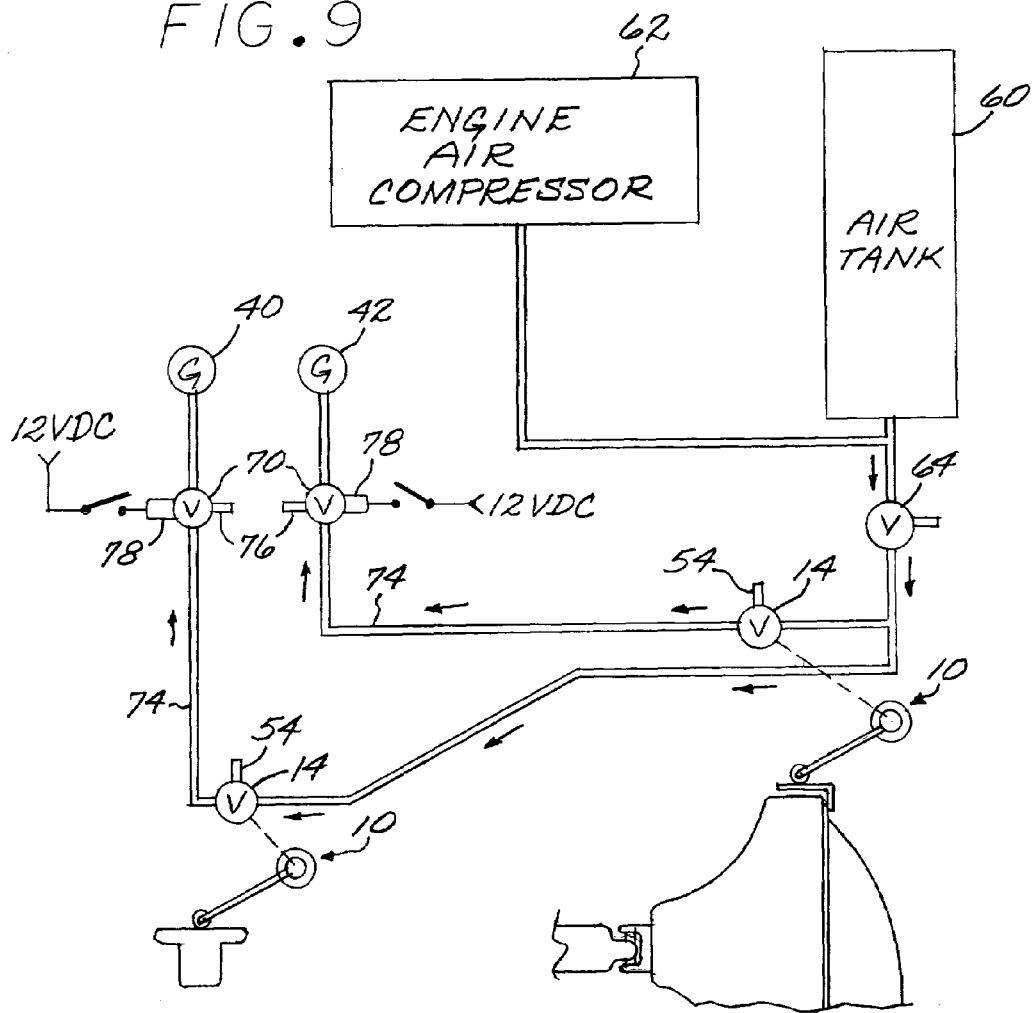
FIG. 9 is a pneumatic schematic of the axle scale according to the present invention.

FIG. 9 shows a preferred embodiment of the pneumatic schematic with two axle scale installations. The pneumatic supply is preferably provided by the truck compressed air reservoir tank 60 used for the braking system although any pneumatic supply may be used. The compresses air reservoir tank 60 is pressurized by the engine air compressor 62. A pneumatic line may be connected to the compressed air reservoir 60 and routed to the supply inlet of the variable pressure valve 14 of the axle scale transmitter assembly 10. However, although not required for the essential operation of the axle scale, the inlet of a low pressure cut off valve 64 is preferably in direct pneumatic communications with the truck compressed air reservoir 60 as the reservoir is typically also used for supplying the braking system. The cut off valve prevents failure of the vehicle braking system in the event of leakage from the axle scale. In the embodiment, shown in FIG. 9, the outlet of the low pressure cut off valve 64 is in direct pneumatic communication with the supply inlet port of the variable pressure valve 14 wherein the low pressure cut off valve 64 further incorporates a pressure regulator function for purposes of improving the accuracy and stability of the scale readings. Optionally the valve, still further, incorporates a filter to protect the axle scale from debris from the compressed air supply.

Also in FIG. 9, the exhaust port 54 of the variable pressure valve 14 vents to the atmosphere preferably through a pneumatic filter thereby preventing debris from entering the valve. Alternatively the exhaust port 54 of the valve is connected to a pneumatic line that is in direct pneumatic communication with the atmosphere at the distal end with the distal end being conveniently fastened to the truck frame in an area less inclined to accumulate debris and where the venting air may be exhausted.

Further in FIG. 9, for transmitter assemblies incorporating a variable pressure valve 14 wherein the output port is restricted to a one way flow, the pressure at the output port is not bled down internally to lower pressures. Therefore, in a preferred embodiment, the outlet port of the variable pressure valve 14 is in direct pneumatic communication with the inlet port of a 3-way pneumatic valve 70 by means of pneumatic line at 74. The 3-way pneumatic valve 70 is used to vent the pneumatic lines connecting the variable pressure valve 14 with the display gauge 40 and 42. The 3-way valve 70 has an inlet port, a first outlet port and a second outlet port and is so engineered as to provide selectable configurations wherein a first configuration is the closed position, a second configuration is the vent position, and a third configuration is the open position. In the closed position, there is no communication between any port. The second configuration provides direct communication between all ports. The third configuration provides direct communication between the inlet port and the second outlet port with the first outlet port shut.

In this preferred embodiment, the outlet port of the axle scale transmitter valve is in direct communication with the inlet port of the selectable 3-way valve 70, the first outlet port 76 is vented to atmosphere, and the second outlet port is in direct pneumatic communication with the display gauge 40. The apparatus is considered to be in the off mode when the 3-way valve is in the closed or first configuration position. In the off mode, no pneumatic communication is present between any ports thereby presenting no pressure to the operator display gauge. In this mode the gauge is protected from pressure transients induced by high dynamic loads as experienced during driving. To activate the system, the operator adjusts the 3-way valve 70 from the first to configuration to the third configuration wherein the valve necessarily, but momentarily is in the second configuration wherein the pneumatic lines connected to the 3-way valve are vented to atmosphere thereby insuring that no pressure exists in the lines which may yield an erroneous reading on the display gauge. When in the on mode, as when the 3-way valve is in the third configuration, the axle scale transmitter valve output is in pneumatic communication with the display gauge and the gauge is pressurized to the output pressure of the transmitter valve.

For embodiments incorporating variable pressure valves that vent internally, the 3-way valve 70 is optional; however presence of the 3-way valve 70 significantly improves the reliability of the system. Without the 3-way valve 70 the operator display gauge 40 is continuously supplied with compressed air from the variable pressure valve 14 during operation of the truck. When the truck is in motion, the dynamic axle loads are displayed on the gauge 40 resulting in shock to the gauge mechanism.

In the preferred embodiment, the 3-way valve is mechanically actuated and manually operated; however, as illustrated in FIG. 9, an electronic solenoid actuator 78 operated 3-way valve may optionally used in the alternative so as to provide remote electrical activation for convenience as may be required for particular installations.

What is claimed is:

1. An axle load scale for vehicles having spring suspensions comprising
    an axle transmitter assembly further comprising
        a pneumatic variable pressure valve having
            a self-returning rotatable activator,
            an inlet supply port, an outlet port, and
            an exhaust port wherein a pneumatic pressure is presented at the output port in direct proportion to the rotational position of the rotatable activator when a pneumatic supply is presented to the inlet supply port with the rotatable activator operable to provide 0 PSI in a rest position and a proportionally increasing pressure corresponding to an increasing degree of rotation; and,
        an actuator lever arm having distal and proximate ends with the proximate end fixed to the rotatable activator; and,
    an operator display gauge in direct pneumatic communication with the output port of the variable pressure valve being a pressure gauge having scale markings associated with the axle load;
    with said axle transmitter assembly being mounted to a vehicle frame such that the distal end of the actuator lever arm rests on the vehicle axle such that the rotatable activator position gauges the vertical displacement of the axle relative to the frame as the axle spring suspension compresses from the assumption of a cargo thereby resulting in a pneumatic pressure presented to the operator display gauge in proportion to the axle load.

2. The axle load scale of claim 1 wherein the operator display gauge has scale provides markings associated with the axle load.

3. The axle load scale of claim 1 wherein the operator display gauge is an analog display type gauge.

4. The axle load scale of claim 1 wherein the operator display gauge is a digital display type gauge.

5. The axle load scale of claim 1 wherein the pneumatic supply is pressurized air supplied from an pneumatic braking system.

6. The axle load scale of claim 1 further comprising a low pressure cut off valve, having an inlet port and an outlet port, having the low pressure cut off valve outlet port in pneumatic communication with the variable pressure valve inlet port and the low pressure cut off valve inlet port in direct pneumatic communication with a pneumatic supply.

7. The axle load scale of claim 1 further comprising a pressure regulator, having an inlet port and an outlet port, having the regulator outlet port in direct pneumatic communication with the variable pressure valve inlet port and the regulator inlet port in pneumatic communication with a pneumatic supply.

8. The axle load scale of claim 6 wherein the low pressure cut off valve further comprises an air filtration element.

9. The axle load scale of claim 1 wherein the actuator lever arm has a clevis and roller bearing fixed to the distal end of the actuator lever.

10. The axle load scale of claim 1 further comprising a three way pneumatic valve interposed between the variable pressure valve and the operator display gauge, having an inlet port, and first and second outlet ports, being operator selectable to a closed first configuration wherein there is no pneumatic communication between any ports, a second configuration wherein pneumatic communication is provided between all ports, and a third configuration wherein pneumatic communication is provided only between the inlet port and the second outlet port, the inlet port being in direct pneumatic communication with the variable pressure valve outlet port, the first outlet port being in direct pneumatic communication with the atmosphere, and the second outlet port being in direct pneumatic communication with the operator display gauge.

11. The axle load scale of claim 10 wherein the three way pneumatic valve further comprises an electronic solenoid actuator operable to select the mode of operation of the three way pneumatic valve.

12. The axle load scale of claim 1 further comprising a pneumatic filter having an inlet in direct pneumatic communication with the variable pressure valve vent port and an outlet port in direct pneumatic communication with the atmosphere.

\* \* \* \* \*